United States Patent
Bala

(10) Patent No.: US 9,697,431 B2
(45) Date of Patent: Jul. 4, 2017

(54) MOBILE DOCUMENT CAPTURE ASSIST FOR OPTIMIZED TEXT RECOGNITION

(71) Applicant: Conduent Business Services, LLC, Dallas, TX (US)

(72) Inventor: Raja Bala, Pittsford, NY (US)

(73) Assignee: Conduent Business Services, LLC, Dallas, TX (US)

(*) Notice: Subject to any disclaimer, the term of this patent is extended or adjusted under 35 U.S.C. 154(b) by 142 days.

(21) Appl. No.: 13/968,534

(22) Filed: Aug. 16, 2013

(65) Prior Publication Data
US 2015/0049948 A1   Feb. 19, 2015

(51) Int. Cl.
- G06K 9/18 (2006.01)
- G06K 9/20 (2006.01)
- G06K 9/00 (2006.01)
- G06K 9/36 (2006.01)

(52) U.S. Cl.
CPC ............. G06K 9/18 (2013.01); G06K 9/2081 (2013.01); G06K 9/00671 (2013.01); G06K 2009/363 (2013.01); G06K 2209/01 (2013.01)

(58) Field of Classification Search
CPC ............. G06K 2209/01; G06K 9/4652; G06K 9/6842; G06K 9/00456; G06K 9/036; G06K 9/3283; G06K 9/348; G06K 9/325; G06K 9/18; G06K 9/00469; G06K 9/3258; G06K 9/00463
See application file for complete search history.

(56) References Cited

U.S. PATENT DOCUMENTS

| | | | |
|---|---|---|---|
| 5,361,134 A | 11/1994 | Hu et al. | |
| 5,491,759 A | 2/1996 | Nagao et al. | |
| 5,513,277 A | 4/1996 | Huttenlocher | |
| 6,005,683 A | 12/1999 | Son et al. | |
| 6,922,487 B2 | 7/2005 | Dance et al. | |
| 7,016,536 B1 * | 3/2006 | Ling | G06T 5/006 382/190 |
| 7,283,274 B2 | 10/2007 | Sharma | |
| 7,446,896 B2 | 11/2008 | Barrios | |
| 7,797,631 B2 | 9/2010 | Yoshida | |

(Continued)

OTHER PUBLICATIONS

Hartley, Richard I., "Self-Calibration from Multiple Views with a Rotating Camera", Computer Vision—ECCV'94. Springer Berlin Heidelberg, 1994, pp. 471-478.

(Continued)

Primary Examiner — Maurice L. McDowell, Jr.
Assistant Examiner — Raffi Isanians
(74) Attorney, Agent, or Firm — Fox Rothschild LLP

(57) ABSTRACT

A device and method for providing a visual cue for improved text imaging on a mobile device. The method includes determining a minimum text size for accurate optical character recognition (OCR) of an image captured by the mobile device, receiving an image stream of a printed substrate, and displaying the image stream and a visual cue superimposed onto the image stream, wherein the visual cue is indicative of the minimum text size. The method further includes capturing a digital image of the image stream, wherein the digital image does not include the visual cue. Additionally, the method further includes notifying a user of the mobile device when text displayed within the image stream is at least as large as the minimum text size.

20 Claims, 7 Drawing Sheets

(56) References Cited

U.S. PATENT DOCUMENTS

| | | |
|---|---|---|
| 8,103,490 B2 | 1/2012 | Voirin et al. |
| 8,384,918 B2 | 2/2013 | Zhan |
| 2003/0086615 A1* | 5/2003 | Dance et al. ............... 382/200 |
| 2006/0136450 A1 | 6/2006 | Barrus et al. |
| 2007/0024872 A1 | 2/2007 | Salgado |
| 2007/0076278 A1 | 4/2007 | Nagarajan |
| 2007/0139722 A1* | 6/2007 | Jordan ............... G06K 9/2054 358/448 |
| 2012/0249554 A1* | 10/2012 | Chen ............... G06K 9/00979 345/428 |
| 2013/0022231 A1 | 1/2013 | Nepomniachtchi et al. |
| 2013/0085935 A1 | 4/2013 | Nepomniachtchi et al. |
| 2014/0152849 A1 | 6/2014 | Bala et al. |

OTHER PUBLICATIONS

Berdugo et al., "Object Reidentification in Real World Scenarios Across Multiple Non-Overlapping Cameras", 18th European Signal Processing Conference (EUSIPCO—2010) Aalborg, Denmark, Aug. 23-27, 2010.

* cited by examiner

MOBILE DOCUMENT CAPTURE ASSIST FOR OPTIMIZED TEXT RECOGNITION

BACKGROUND

Mobile devices, such as smartphones, tablet computers, and other similar computing devices, are increasingly being used for capturing and processing data such as images and text. Typically, a mobile device includes a high quality camera that can be used to capture images of printed documents. For example, a customer may be asked to print and fill out a form, and send a digital copy of the completed form to a specific vendor for further processing. The user may opt to capture an image of the form with their mobile device. Software installed on the device may then further process the captured image. For example, the software may be configured to enhance, recognize, store and share the images of printed documents. Continuing the above example, the user may store the captured image of the form and transmit the image to the vendor.

The mobile device used to capture the image of the printed document may be limited by software and hardware components within the device. For example, the mobile device's camera may contain a camera lens that has a focal length that prevents the lens from accurately focusing on an object a short distance away. When such a limitation exists, a user holding the device too closely to the printed document may not be able to properly focus upon the printed document.

Conversely, for the purposes of text quality, if a user is too far from the printed document, the text may be distorted, of insufficient resolution, or otherwise illegible, thereby reducing the overall quality of the captured text. This reduced quality can adversely affect optical character recognition (OCR) and other recognition algorithms. Quality correction can be applied after capture; however, the resolution that is inherently lost as a result of the poor image quality can never be recovered perfectly via digital processing after the image is captured.

SUMMARY

In one general respect, the embodiments disclose a method of providing a visual cue for improved text imaging on a mobile device. The method includes determining a minimum text size for accurate optical character recognition (OCR) of an image captured by the mobile device, receiving an image stream of a printed substrate, and displaying the image stream and a visual cue superimposed onto the image stream, wherein the visual cue is indicative of the minimum text size.

In another general respect, the embodiments disclose a mobile device. The mobile device includes a processing device, a display operably connected to the processing device and having an associated display resolution, an image capture device operably connected to the processing device and having an associated image capture resolution, and a computer readable medium in communication with the processing device. The computer readable medium comprising one or more programming instructions for causing the processing device to determine a minimum text size for accurate optical character recognition (OCR) of an image captured by the mobile device, receive an image stream of a printed substrate as captured by the image capture device, and display the image stream and a visual cue superimposed onto the image stream on the display, wherein the visual cue is indicative of the minimum text size.

DETAILED DESCRIPTION

Figure 1:
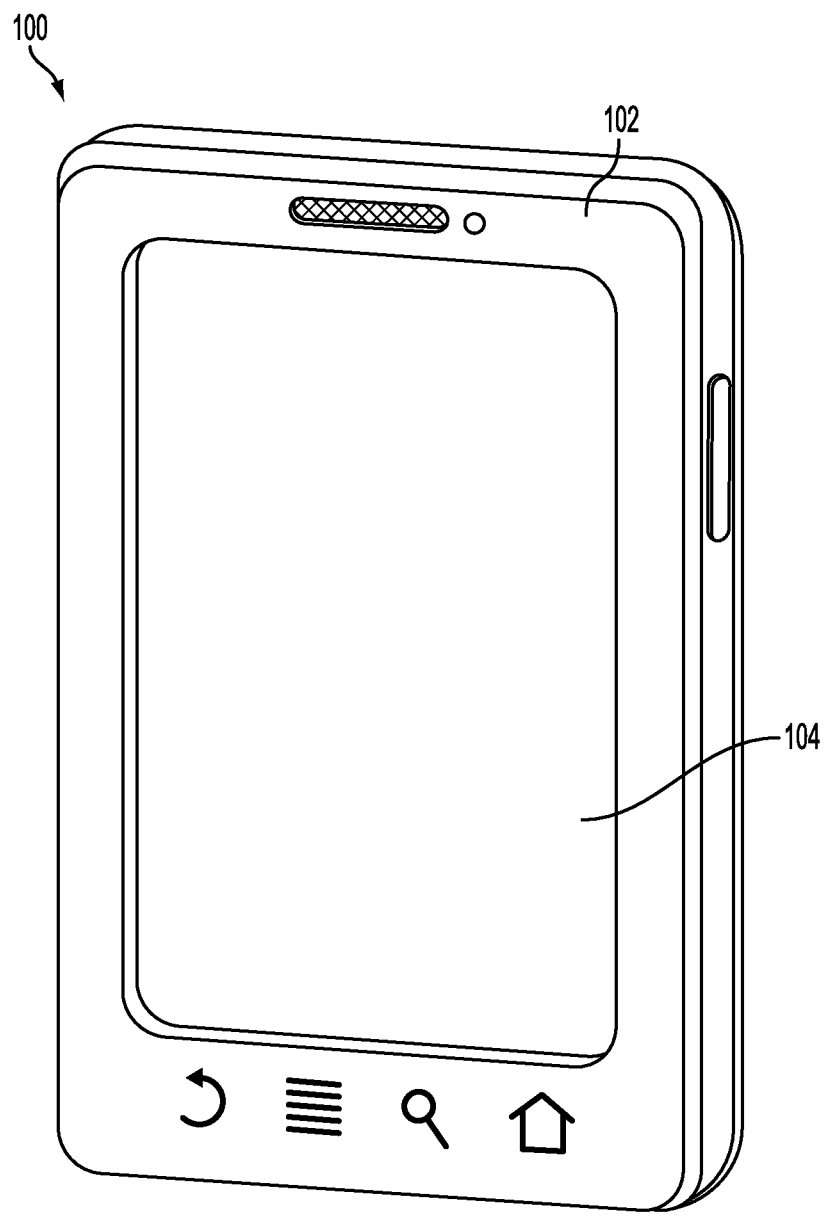
FIG. 1 depicts a first or front face of a mobile device that includes a camera configured to capture an image according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

For the purposes of this document, a "printed document" or "document" refers to a hardcopy of one or more pieces of printed substrates containing a combination of text and/or images. For example, the document may be a form, a page from a book or other publication, a poster, a billboard or another similar form of advertising, and any other printed surface.

A "mobile device" refers to a portable computing device that includes an image capturing device, a processor and tangible, computer-readable memory. The memory may contain programming instructions in the form of a software application that, when executed by the processor, causes the device to perform one or more image acquisition and processing operations according to the programming instructions. Examples of suitable devices include portable electronic devices such as smartphones, personal digital assistants, cameras, tablet devices, electronic readers, personal computers, media players, satellite navigation devices and the like.

An "imaging device" refers to any device capable of optically viewing an object and converting an interpretation of that object into electronic signals. One such example of an imaging device is a camera. An "image capture module" refers to the software application and/or the image sensing hardware of an electronic device that is used to capture images.

An "optical character recognition (OCR) engine" refers to one or more software applications configured to digitally convert images of captured text into machine-encoded text.

"Augmented reality" (AR) refers to the concept of combining a real scene viewed by a user with a virtual scene overlay generated by a computing device that augments the real scene with additional useful information.

The use of mobile devices for scanning printed documents comes with unique opportunities as well as unique challenges. Advantages include low-cost, portability, ubiquity, increasing computational power, and the integration of multiple imaging devices and image capture modules into a single mobile device. Challenges include the variety of capture conditions, including lighting variation, geometry and spacing of the object being captured, motion caused blur, and other factors that can affect image quality. As described herein, various concepts related to AR may be incorporated into an image capturing process as used by a mobile device to improve the quality of printed document images captured by the mobile device so as to provide improved text recognition from the captured image.

Various aspects of AR may be integrated into the image capturing process to reduce problems associated with low quality text capture, which can greatly affect the quality of an image of a printed document for use in OCR and other recognition applications. Using AR techniques, a textual or other similar visual cue may be displayed to a user of a mobile device, the visual cue providing a visual reference of a suitable text size for accurate OCR processing.

In image capture, for a given sensor/optics configuration integrated in an imaging device, there is a linear relationship between capture distance (or optical zoom) and image resolution (as measured, for example, by average text character width in pixels). Thus, when capturing an image of text, the small the text in the image the lower the resolution of the text. In turn, there exists a proportional (though nonlinear) relationship between image resolution and OCR accuracy as obtained by a given OCR engine.

Typically, OCR performance and accuracy degrades rapidly when character resolution falls below a certain threshold. In experiments performed with state of the art OCR engines such as ABBYY or Nuance, this threshold resolution is approximately 16 pixels per character. For typical modern smartphones, this resolution is achieved when capturing printed text with a 12 point font size at a distance of approximately 12 inches. Thus, in order to capture sufficient character resolution for obtaining high accuracy OCR, a minimum text size of no fewer than 16 pixels per character is preferable.

It should be noted that 16 pixels per character is shown as an example only. The minimum sizing requirements may vary based upon the type of device being used to capture the text image, as well as the OCR engine being used and any operational parameters associated with the OCR engine. However, a visual cue may be determined based upon the minimum acceptable sizing requirements for recognizing text according to the techniques as described herein regardless of the capabilities of the image sensor and OCR engine.

FIG. 1 shows one example of a mobile device, generally designated 100. The mobile device 100 may include a front face 102 and a display 104. The display 104 may be any suitable component for displaying images, including, but not limited to, electroluminescent displays, electronic paper displays, vacuum fluorescent displays, light emitting diode (LED) displays, cathode ray tube (CRT) displays, liquid crystal (LCD) displays, plasma display panels, digital light processing (DLP) displays, and organic light-emitting diode (OLED) displays. The display 104 may further include a touch sensitive screen, including, but not limited to, resistive touchscreens, capacitive touchscreens, and infrared touchscreens.

Figure 2:
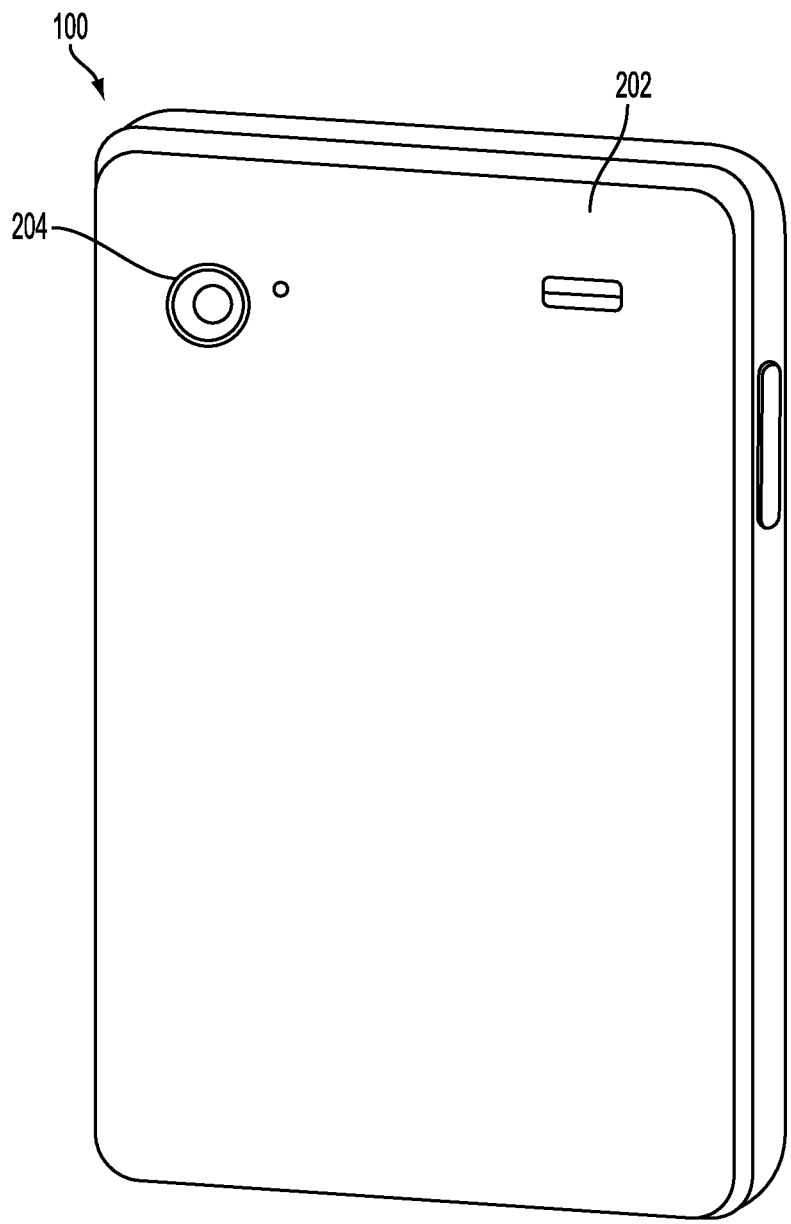
FIG. 2 depicts a second or rear face of a mobile device that includes a camera configured to capture an image according to an embodiment.

FIG. 2 shows a rear face 202 of the mobile device 100. The rear face 202 may include an imaging device 204. The imaging device 204 may be any suitable component capable of receiving an optical image and transmitting the information to other components for processing.

The imaging device may further have an ability to adjust its focal length and aperture in such a manner that would allow it to zoom and properly focus upon an intended object to be imaged. This adjustment may define an "optimal focal distance," or a range of distances in which the mobile device 100 may be properly positioned from the intended object to be imaged to achieve a clear image.

While the imaging device 204 is depicted on the rear face of the present example, persons skilled in the art will appreciate that the imaging device 204 may be positioned at any location upon any face of the mobile device 100, or may even be external to the mobile device 100 and connected by any means of electronic communication, including, but not limited to, physical cable communication such as universal serial bus (USB), wireless radio communication, wireless light communication, or near field communication technology.

In some embodiments, the display 104 may be positioned within the mobile device 100, and may be configured in such a way so as to display the output of the imaging device 204 in real time so that the user may view the display 104 and see the output of the imaging device 204 on the display.

Accordingly, the configuration of the mobile device 100 as shown in FIGS. 1 and 2 is only an example, and persons skilled in the art will appreciate other configurations that are able to achieve a similar overall result.

Figure 3:
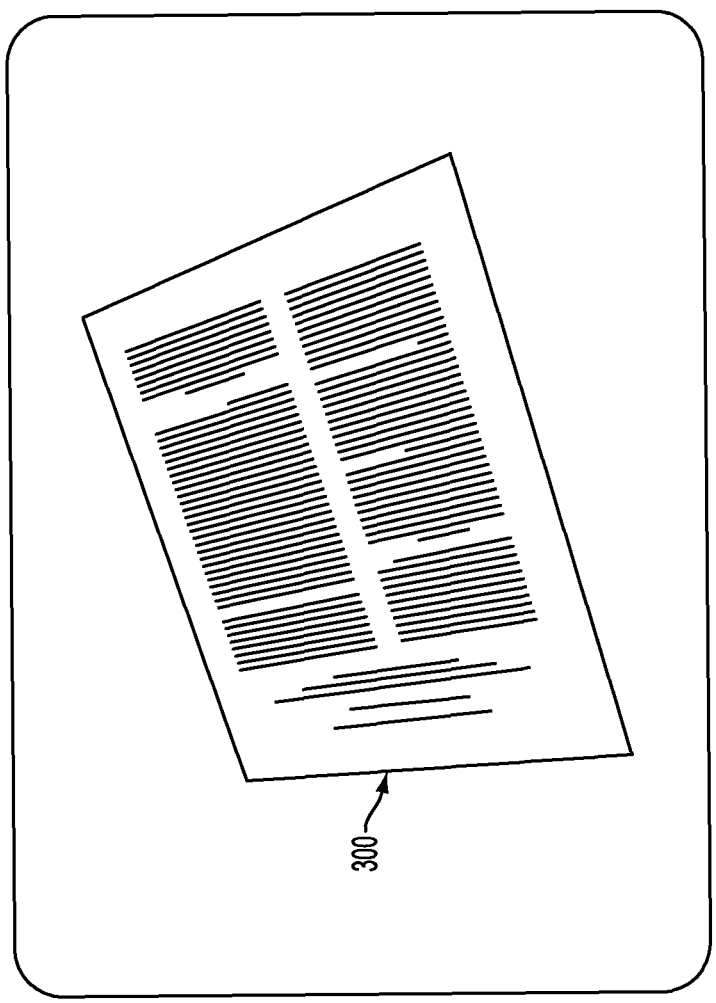
FIG. 3 depicts an example of a printed document to be captured according to an embodiment.

The mobile device 100 may be used to capture an image of a printed document 300, as shown in FIG. 3. The mobile device 100 may be positioned so that the imaging device 204 is facing the printed document 300 desired to be imaged. Preferably, but not necessarily, the printed document 300 is placed on a flat (but not necessarily horizontal) surface as is shown in FIG. 3. The imaging device 204 may be activated to view the printed document 300, wherein the mobile device 100 may capture and render an image depicting the printed document 300 upon the display 104 by use of an image capture module.

Figure 4A:
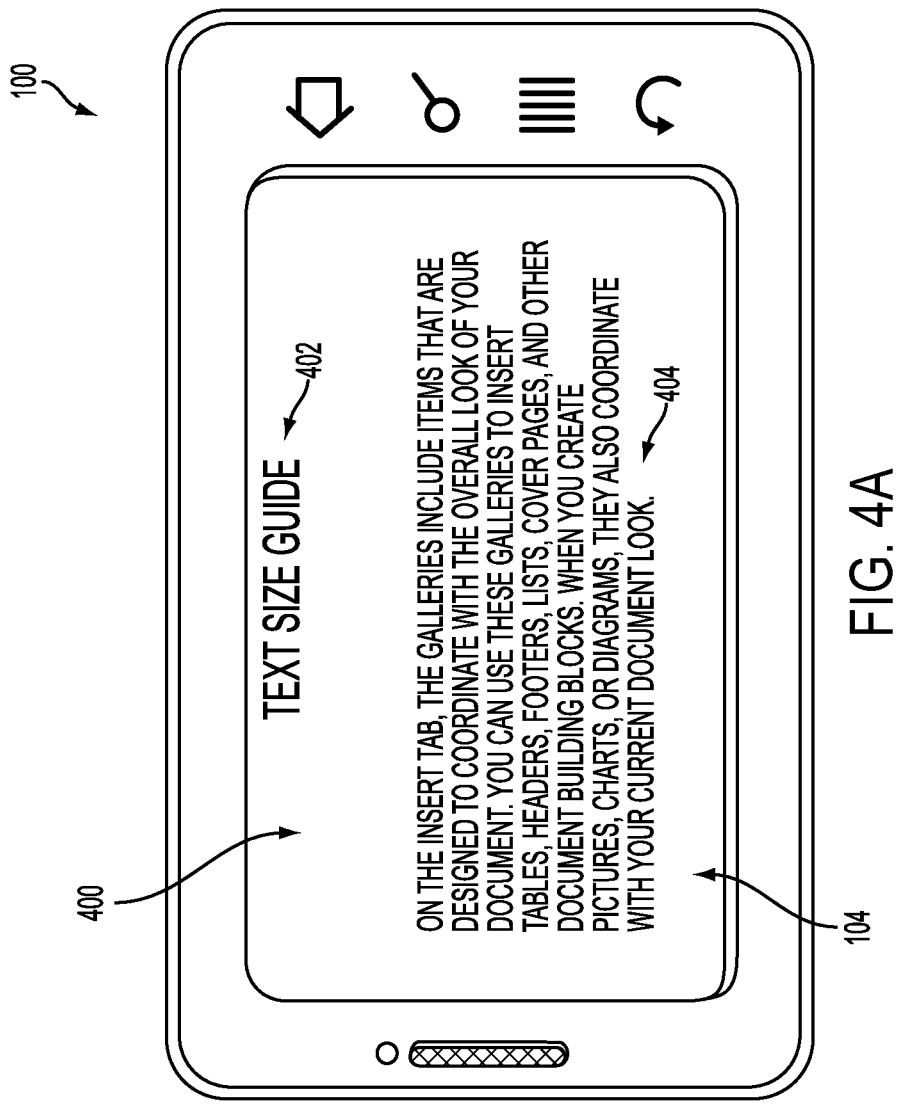
FIG. 4A depicts an example of a screenshot of a displayed document including an example of a visual marker according to an embodiment.

In accordance with the present disclosure, a visual cue may be overlaid onto an image of a text document being captured for the purposes of ensuring high quality capture of text images. As shown in FIG. 4A, the image capture module or another similar software module may include a visual cue 402 superimposed onto a display 400 of text 404 being captured. It should be noted that, as used herein, the term "text" refers to any alphanumeric characters. To enable the visual cue 402, the user of mobile device 100 may launch or otherwise access an application specifically intended for capturing an image of text. The application may superimpose the visual cue 402 onto the display 400. Alternatively, an image capture application may detect that the image includes text, and superimpose the visual cue 402 automatically without additional user input.

It should be noted that, as shown in FIG. 4A (and FIG. 4B as described below), the visual cue 402 is a text string reading "TEXT SIZE GUIDE." This is shown by way of example only, and additional visual cues may be used. For example, a visual cue may include a geometric shape such as a rectangular bounding box indicating minimum height or width for text being captured. Alternatively, the visual cue may be an interactive cue that changes based upon a user's actions. For example, the cue may be a colored circle in a corner of the display. The cue may remain red until the text is an acceptable size. Once the text is determined to be an acceptable size (i.e., above a minimum width or height in pixels for each character), the cue may change colors e.g., from red to green.

Figure 4B:
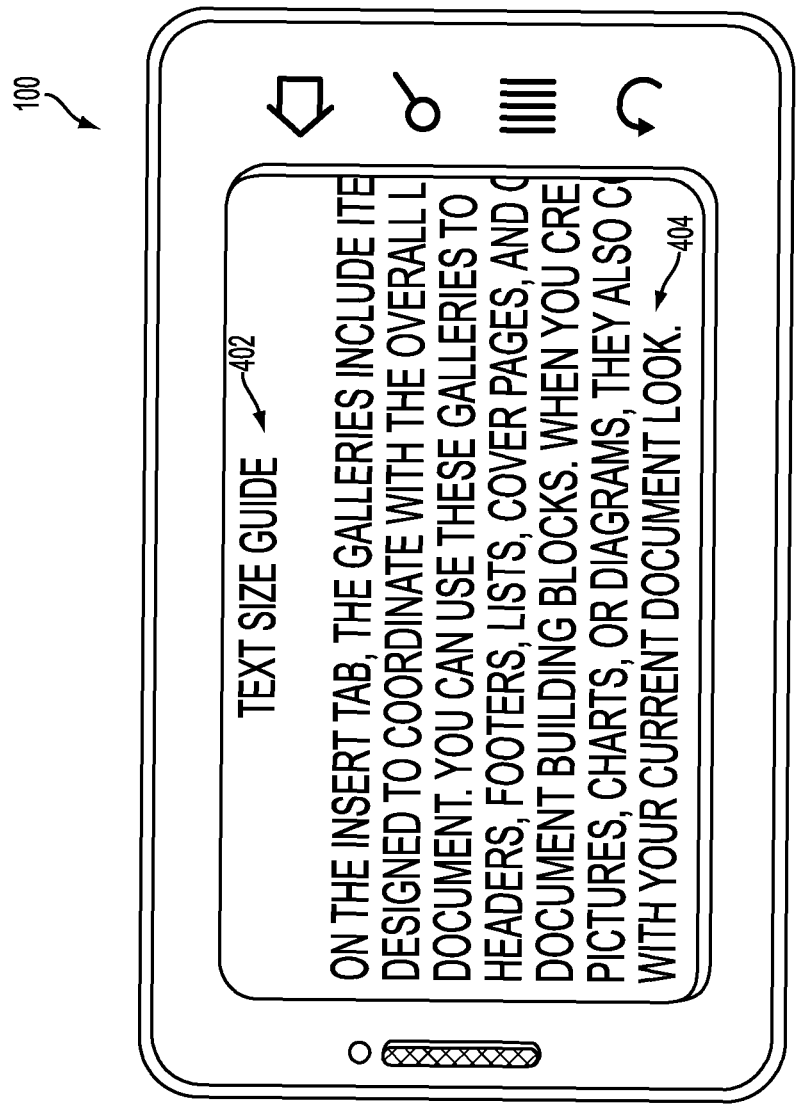
FIG. 4B depicts a second example of a screenshot of a displayed document including the visual marker according to an embodiment.

Referring again to FIG. 4A, as the user moves the device 100, or alters the zoom of the device, the visual cue 402 may provide a reference for acceptable text character size for ensuring that the quality of any captured text is suitable for OCR. As shown in FIG. 4B, as the use zooms in on the text 404, either by moving the device 100 closer to the document or using an optical zoom, the text 404 increases in size. However, the visual cue 402 remains at a constant size, thereby providing the user with a reference for properly sizing the text 404.

It should be noted that, as shown in FIGS. 4A and 4B, the visual cue 402 is positioned at the top center of the display. However, this is shown by way of example only. The position of the visual cue 402 may be varied based upon user preference or by the performance capabilities of the image capture application. For example, the image capture application may have the capability to detect white space in a document. In this example, the visual cue may be displayed within a white space of the document so as to not interfere with display of the text to be captured. If no white space is detected, the visual cue may be positioned at a default location such as is shown in FIGS. 4A and 4B.

Figure 5:
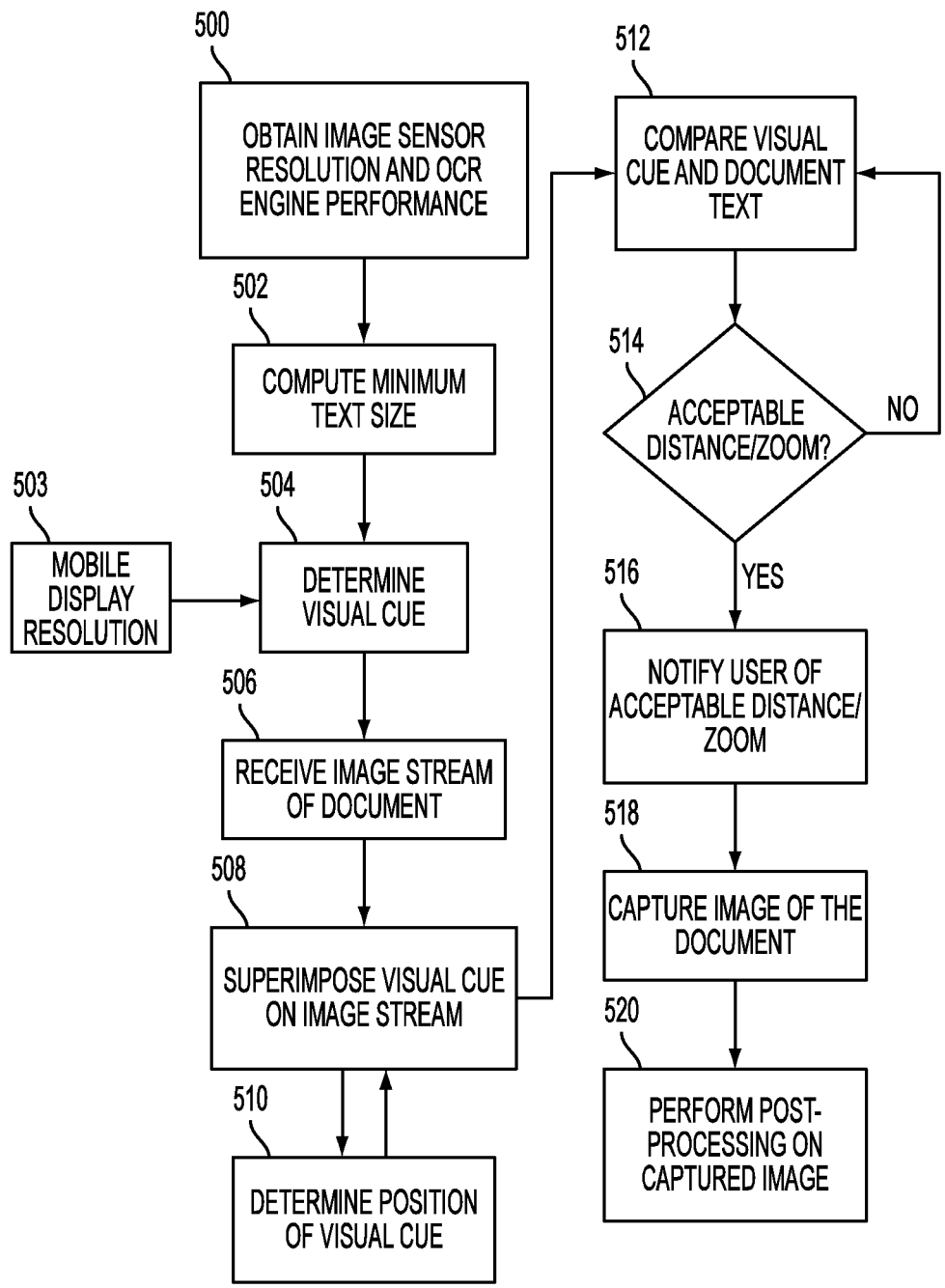
FIG. 5 depicts a flow chart example of a process for viewing and capturing an image of a printed document using visual markers to optimize text recognition according to an embodiment.

FIG. 5 depicts a sample process flow for acquiring an image of text using the concepts and ideas as discussed above. A processing device, such as the mobile device 100, may obtain 500 image sensor resolution and OCR engine performance as a function of character resolution for that mobile device for use with an image capture application or a text-specific image-capture application as described above. Based upon these values, the mobile device may compute 502 the minimum text size for accurate OCR performance. For example, the computed 502 minimum text character size may be 16 pixels wide. However, to further ensure high quality, a larger minimum character width of, for example, 20 pixels may be used.

The mobile device may also determine 504 the visual cue, including what size to make the visual cue such that, as the visual cue is displayed on the screen of the mobile device, it is accurately sized to represent the minimum text size for high OCR performance and accuracy. A specific set of equations may be used to determine 504 the size of the visual cue.

Based upon the resolution of the image sensor, the size of an image being captured may be represented as M1×N1, and the display screen resolution for the mobile device 503 may be represented as M2×N2. Typically, M1<<M2 and N2<<N1. Next a ratio, r=max(M2/M1, N2/N1) of the display resolution and captured image resolution is computed. Minimum acceptable character size (e.g., 20 pixels as discussed above) may be represented by L1. Then, the character width as shown on the mobile device screen may be defined as L2=r*L1. Based upon the result of this equation, the mobile device may accurately determine 504 the size of the visual cue to display on the mobile device screen.

A mobile device may receive 506 an image stream or video capture of a printed document, and display the image stream on the display of the mobile device. The image stream may be live view of the printed document as it is currently aligned and oriented in relation to the mobile device. At or about the same time, the mobile device may superimpose 508 the visual cue on the image stream. As described above, the user may access a specific text capturing application that superimposes the visual cue onto the image stream, or the standard image capturing software installed on the mobile device may be configured to identify that the user is taking an image of text, and automatically superimpose 508 the visual cue onto the image stream. Alternatively, the user may choose an option to display the text size guide during capture.

It should be noted that, as described above, the visual cue may be a representation of the minimum sized text the user should capture to ensure that OCR accuracy remains acceptable. The visual cue may be a text string including appropriately sized characters (as shown in FIGS. 4A and 4B), a geometric shape representing minimum character size, or a dynamic cue that provides an indication (e.g., a visual change, sound cue or haptic notification) that the text being displayed in the image stream is an acceptable size.

Optionally, the mobile device may determine 510 a suitable position within the image stream for placing the visual cue in such a manner that the cue brings attention to the user and does not interfere with the text content being captured. For example, the mobile device 510 may determine that there is a portion of white space within the image stream and superimpose 508 the visual cue at that position so as to not interfere with the user's view of the text being captured. Additionally, the mobile device may determine 510 an orientation of the visual cue based upon the position of the mobile device and the document being captured. For example, as shown in FIGS. 4A and 4B, if the mobile device is placed in a landscape mode, the visual cue is rotated such that it is legible to the user. Alternatively, the visual cue may be positioned such that the visual cue is oriented in a similar manner to the text being captured, regardless of the position of the mobile device.

The mobile device may continually update the image stream as the user moves the mobile device, and the user may compare 512 the size of the visual cue and the text being captured. Alternatively, if the mobile device is using a dynamic cue, the mobile device may compare 512 the visual cue and the text automatically by comparing the number of pixels in the image stream text against the minimum number of pixels for producing a high quality image for OCR accuracy.

If the mobile device is automatically comparing 512 the visual cue and the document text, the mobile device may determine 514 if the mobile device is at an acceptable distance or zoom setting for capturing the text.

If the processor does determine 514 that the mobile device is at an acceptable distance and zoom for capturing the text, the processor may notify 516 the user by altering the visual cue (e.g., changing the color of the visual cue), outputting a sound, causing a haptic feedback such as vibration, or otherwise altering the output of the screen.

The user may then opt to capture 518 an image of the printed document. For example, the user may use an input device such as a button or an active portion of the display to capture 518 the image. Alternatively, the mobile device may be configured to automatically capture 518 an image of the text. For example, once the mobile device determines the text size in the image stream matches or exceeds that the minimum size indicated by the visual cue, the mobile device may automatically capture 518 the image. Similarly, if the user holds the mobile device still for a period of time (e.g., 1 second) after the text size in the image stream matches or exceeds the minimum size indicated by the visual cue, the mobile device may automatically 518 capture the image. Based upon the available features of the mobile device and the image capture application, the user may have the option to select various image capture features such as automatic image capture, and select which of the automatic features are enabled prior to launching the application, or during normal operation of the application.

Once an image is captured 518, post-processing 520 may then be performed on the captured image. The post-processing 520 may include performing an OCR or other similar recognition algorithm, updating meta-data associated with the captured image, enhancing the quality of the captured image, and other similar post-processing techniques.

Figure 6:
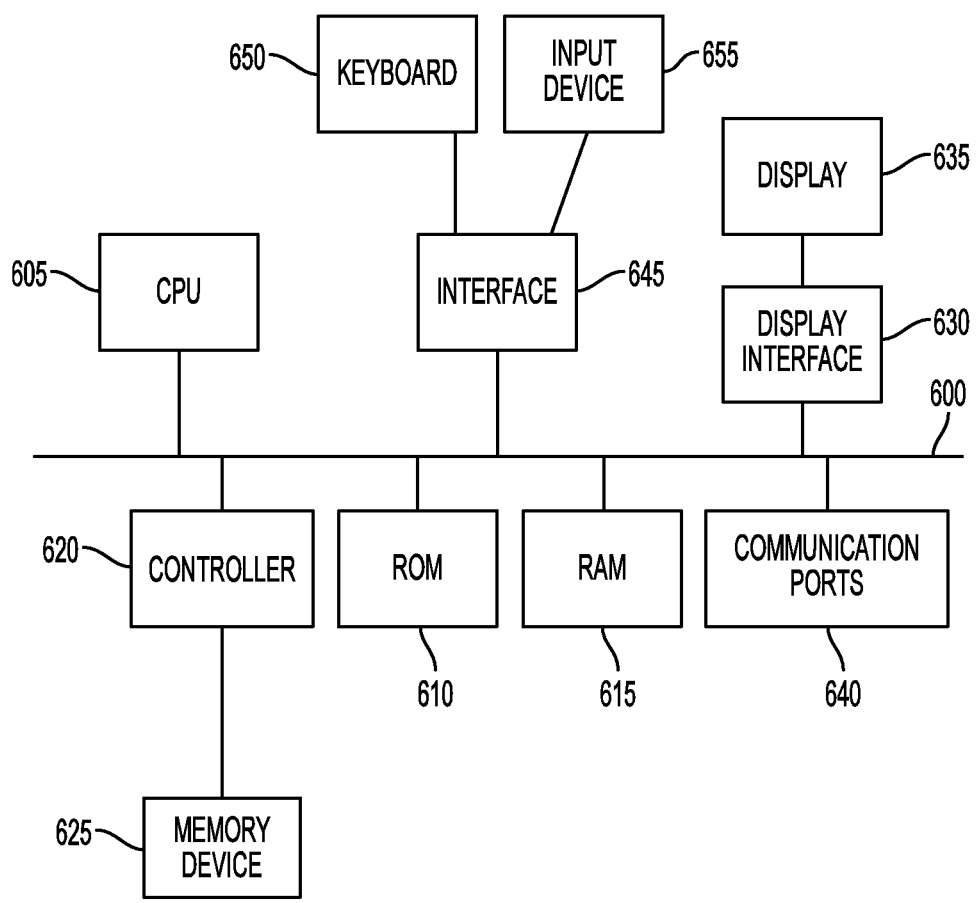
FIG. 6 depicts various embodiments of a computing device for implementing the various methods and processes described herein.

As discussed above, the visual cue display and text capture method and process as described above may be performed and implemented by an operator of a mobile device. FIG. 6 depicts an example of internal hardware that may be used to contain or implement the various computer processes and systems as discussed above. For example, mobile device 100 as discussed above may include a similar internal hardware architecture to that as illustrated in FIG. 6. An electrical bus 600 serves as the main information highway interconnecting the other illustrated components of the hardware. CPU 605 is the central processing unit of the system, performing calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 interfaces with one or more optional memory devices 625 to the system bus 600. These memory devices 625 may include, for example, an external DVD drive or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface 630 may permit information from the bus 600 to be displayed on the display 635 in audio, visual, graphic or alphanumeric format. Communication with external devices may occur using various communication ports 640. A communication port 640 may be attached to a communications network, such as the Internet, a local area network or a cellular telephone data network.

The hardware may also include an interface 645 which allows for receipt of data from input devices such as a keyboard 650 or other input device 655 such as a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of providing a visual cue for improved text imaging on a mobile device, the method comprising:
   determining, by a processing device operably connected to a mobile device, a minimum text size for optical character recognition (OCR) of an image captured by the mobile device;
   receiving, by an image capturing device operably connected to the mobile device, an image stream of a printed substrate of a document;
   comparing, by the processing device, a size of a visual cue and the minimum text size for optical character recognition; and
   displaying, on a display operably connected to the mobile device, the image stream and the visual cue superimposed onto a portion of a white space of the document in the image stream, wherein the size of the visual cue is based on the minimum text size.

2. The method of claim 1, further comprising notifying, by the processing device, a user of the mobile device when text displayed within the image stream is at least as large as the minimum text size.

3. The method of claim 2, wherein the notifying comprises altering the visual cue, outputting a sound, causing a haptic feedback, or altering the image stream.

4. The method of claim 1, further comprising determining, by the processing device, a size of the visual cue based upon image capturing device resolution, display resolution, and OCR engine operational requirements.

5. The method of claim 1, further comprising capturing, by the image capturing device, a digital image of the image stream, wherein the digital image does not include the visual cue.

6. The method of claim 1, wherein the visual cue comprises a geometric shape or an interactive cue.

7. The method of claim 1, further comprising determining, by the processing device, a position of the visual cue within the image stream based upon an analysis of the image stream captured by the capture device.

8. The method of claim 7, wherein the analysis of the image stream comprises minimizing interference between the visual cue and printed content being captured, wherein minimizing the interference comprises:
   determining a portion of the document that is free of text content; and
   positioning the visual cue in the portion that is free of text content.

9. The method of claim 1, wherein the visual cue comprises a bounding box.

10. The method of claim 1, wherein the visual cue comprises a text string.

11. A mobile device comprising:
   a processing device;
   a display operably connected to the processing device and having an associated display resolution;
   an image capture device operably connected to the processing device and having an associated image capture resolution; and
   a non-transitory computer readable medium in communication with the processing device, the computer readable medium comprising one or more programming instructions for causing the processing device to:

determine a minimum text size for optical character recognition (OCR) of an image captured by the mobile device, receive an image stream of a printed substrate of a document as captured by the image capture device, compare a size of a visual cue and the minimum text size for optical character recognition, and display the image stream and the visual cue superimposed onto a portion of a white space of the document in the image stream on the display, wherein the size of the visual cue is based on the minimum text size.

12. The mobile device of claim 11, wherein the one or more instructions further comprise instructions for causing the processing device to output a notification to a user of the mobile device when text displayed within the image stream is at least as large as the minimum text size.

13. The mobile device of claim 12, wherein the notification comprises altering the visual cue, outputting a sound, causing a haptic feedback, or altering the image stream.

14. The mobile device of claim 11, wherein the one or more instructions further comprise instructions for causing the processing device to determine a size of the visual cue based upon the image capture resolution, the display resolution, and OCR engine operational requirements.

15. The mobile device of claim 11, wherein the one or more instructions further comprise instructions for causing the processing device to capture a digital image of the image stream, wherein the digital image does not include the visual cue.

16. The mobile device of claim 11, wherein the visual cue comprises a geometric shape, a bounding box, or an interactive cue.

17. The mobile device of claim 11, wherein the one or more instructions further comprise instructions for causing the processing device to determine a position of the visual cue within the image stream based upon an analysis of the image stream captured by the capture device.

18. The mobile device of claim 17, wherein the instructions that cause the processing device to analyze the image stream further comprise instructions for causing the processing device to minimize interference between the visual cue and printed content being captured.

19. The mobile device of claim 18, wherein the instructions that cause the processing device to minimize the interference comprise instructions for causing the processing device to:

determine a portion of the document that is free of text content; and position the visual cue in the portion that is free of text content.

20. The mobile device of claim 11, wherein the visual cue comprises a text string.

* * * * *